(12) United States Patent
Miyazaki

(10) Patent No.: US 7,536,580 B2
(45) Date of Patent: May 19, 2009

(54) SYSTEM AND METHOD FOR GENERATING TIMER OUTPUT CORRESPONDING TO TIMER REQUEST FROM PLURALITY OF PROCESSES

(75) Inventor: Kiyoshi Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 547 days.

(21) Appl. No.: 11/442,235

(22) Filed: May 30, 2006

(65) Prior Publication Data

US 2007/0198869 A1      Aug. 23, 2007

(30) Foreign Application Priority Data

Feb. 20, 2006   (JP)   .............. 2006-042819

(51) Int. Cl.
*G06F 1/14*  (2006.01)
(52) U.S. Cl. .................. 713/502; 713/500; 713/600
(58) Field of Classification Search .............. 713/500, 713/501, 502, 600; 327/3
See application file for complete search history.

(56) References Cited

U.S. PATENT DOCUMENTS 4,712,072 A * 12/1987 Kawanabe ............... 327/23
5,185,880 A * 2/1993 Ueda et al. .............. 713/500
5,758,137 A * 5/1998 Armstrong et al. ......... 713/502
5,838,957 A * 11/1998 Rajaraman et al. ......... 713/502

FOREIGN PATENT DOCUMENTS

| JP | 62-274815 A | 11/1987 |
|---|---|---|
| JP | 7-28554 A | 1/1995 |
| JP | 2000-259429 A | 9/2000 |

* cited by examiner

*Primary Examiner*—Thuan N Du
(74) *Attorney, Agent, or Firm*—Westerman, Hattori, Daniels & Adrian, LLP.

(57) ABSTRACT

The present invention relates to timer generation corresponding to a plurality of timer requests, etc. necessary for task processes of a CPU and achieves efficient timer generation. The present invention includes a count setting unit (register) presetting a timer value that should be set at the time of completion of counting in a counter (down counter) that counts down or up a lapse of time to achieve the start and switching of the timer operation even without a high-speed response in the CPU. In such a configuration, a CPU clock can be operated at lower speed and the reduction of the consumption currents can be achieved. The present invention is applied to various electronic apparatuses such as portable terminal apparatuses.

12 Claims, 20 Drawing Sheets

FIG.4

| | | | |
|---|---|---|---|
| TIMER I | TIMER VALUE 1 | DIFFERENCE (=0) | REQUEST SOURCE NUMBER 1 |
| TIMER II | TIMER VALUE 2 | DIFFERENCE 2 | REQUEST SOURCE NUMBER 2 |
| TIMER IV | TIMER VALUE 4 | DIFFERENCE 4 | REQUEST SOURCE NUMBER 4 |
| | ⋮ | ⋮ | ⋮ |
| | TIMER VALUE n | DIFFERENCE n | REQUEST SOURCE NUMBER n |

FIG.5

| | | | |
|---|---|---|---|
| TIMER I | TIMER VALUE 1 | DIFFERENCE (=0) | REQUEST SOURCE NUMBER 1 |
| TIMER II | TIMER VALUE 2 | DIFFERENCE 2 | REQUEST SOURCE NUMBER 2 |
| TIMER III | TIMER VALUE 3 | DIFFERENCE 3 | REQUEST SOURCE NUMBER 3 |
| TIMER IV | TIMER VALUE 4 | DIFFERENCE 4 − DIFFERENCE 3 | REQUEST SOURCE NUMBER 4 |
| | ⋮ | ⋮ | ⋮ |
| | TIMER VALUE n | DIFFERENCE n | REQUEST SOURCE NUMBER n |

SYSTEM AND METHOD FOR GENERATING TIMER OUTPUT CORRESPONDING TO TIMER REQUEST FROM PLURALITY OF PROCESSES

CROSS-REFERENCE TO RELATED APPLICATIONS

This application is based upon and claims the benefit of priority from the prior Japanese Patent Application No. 2006-42819, filed on Feb. 20, 2006, the entire contents of which are incorporated herein by reference.

BACKGROUND OF THE INVENTION

1. Field of the Invention

The invention relates to timer generation corresponding to timer request from a plurality of task processes such as an application program executed by a computer and, particularly, relates to a timer apparatus, a timer processing method, and an electronic apparatus that use a variable timer circuit.

2. Description of the Related Art

While various electronic apparatuses such as portable terminal apparatuses are provided with CPUs (Central Processing Units) in control systems to achieve timer generation and perform control to generate a plurality of necessary time periods with software with the use of periodical interruptions (hereinafter, "basic timing") at regular intervals, for example, 10 [msec] or 5 [msec], currents are increased by operating the CPUs periodically.

Such timer generation is included in Japanese Patent Application Laid-Open Publication Nos. 2000-259429, 1987-274815, and 1995-28554; Japanese Patent Application Laid-Open Publication No. 2000-259429 discloses managing timer events in a plurality of systems in an integrated fashion to achieve a plurality of different system operations with one timer apparatus; Japanese Patent Application Laid-Open Publication No. 1987-274815 discloses a timer apparatus that stores, updates, or detects time-out of timer values corresponding to a plurality of control apparatus to enable the clocked timer values or the time-out to be taken out to the outside for managing the timing of the control apparatuses or the time period until time-out; and Japanese Patent Application Laid-Open Publication No. 1995-28554 discloses a timer count mode that determines counting priorities from in ascending order of timer values and that counts the timer value with a timer start request to issue a time-up notification concurrently with the completion of the counting.

By the way, as in the case of Japanese Patent Application Laid-Open Publication No. 1995-28554, in an updating method of a timer value, high-speed interruption response performance is required for receiving timing interruptions of timer updates and, to perform control in short time intervals, a high-speed CPU is required to shorten the timer update timing from 10 [msec] to 2 [msec], for example. Such a high-speed CPU causes increase in consumption currents. If the operating clock of the CPU is cut down to reduce the consumption currents, omission in the timer processes, etc. may be caused.

Japanese Patent Application Laid-Open Publication Nos. 2000-259429, 1987-274815, and 1995-28554 do not disclose or indicate such problems and do not describe or indicate means for solving the problems.

SUMMARY OF THE INVENTION

A first object of the present invention relates to timer generation corresponding to a plurality of timer requests necessary for task processes of a CPU and is to achieve efficient timer generation.

A second object of the present invention relates to the timer generation and is to achieve the start and switching of the timer operation.

A third object of the present invention relates to the timer generation and is to achieve reduction of consumption currents due to the timer operation of the CPU.

The present invention includes a count setting unit presetting a timer value that should be set at the time of completion of counting in a counter that counts down or up a lapse of time to achieve the start and switching of the timer operation even without a high-speed response in the CPU. In such a configuration, a CPU clock can be operated at lower speed and the reduction of the consumption currents can be achieved. The present invention is applied to various electronic apparatuses such as portable terminal apparatuses.

In order to achieve the above objects, a first aspect of the present invention provides a timer apparatus that generates a timer output corresponding to a timer request, comprising a first count setting unit that sets a first count value relating to the timer request; a second count setting unit that sets a second count value relating to the timer request; a counter that counts the first count value or the second count value, when the count value attains the first count value or the second count value, the counter generating a timer output that represents the attainment; and a calculating unit that calculates a difference value between the value counted by the counter and the second count value in the second count setting unit, the first count value or the second count value being updated to the difference value to allow the counter to count, correspondingly to a magnitude relation between the difference value and the second count value.

According to such a configuration, the counting is performed in the counter correspondingly to the first count value or the second count value; a difference value between the value in the count operation and the second count value is compared with the second count value; and from the magnitude relation thereof, the first count value or the second count value is updated to the difference value to perform efficient timer switching. Such process is performed by the timer apparatus independently of the process of the CPU for the timer request. In this way, the above objects are achieved.

In order to achieve the above objects, the timer apparatus may comprise a storing unit that receives a plurality of timer values relating to a plurality of timer requests to store the timer value for each timer request, the storing unit storing a difference between a certain timer value and another timer value for each of the timer values; and a timer setup processing unit that sets the first count value or the second count value to the timer value or the difference value read from the storing unit. The timer apparatus may comprise notifying means, in case where the first count value or the second count value is updated to the difference value, notifying a timer request source of the update. The timer apparatus may comprise a storing unit that receives a plurality of timer values relating to a plurality of timer requests to store the timer value for each timer request, the storing unit storing a difference between a certain timer value and another timer value for each of the timer values; and a timer request acceptance processing unit that calculates a difference between a certain timer value and another timer value for each of the timer requests to store the difference value into the storing unit for each of the timer values.

To achieve the above objects, a second aspect of the present invention provides a timer processing method that generates a timer output corresponding to a timer request, comprising the processes of setting a first count value relating to the timer request; setting a second count value relating to the timer request; counting the first count value or the second count value and, when the count value attains the first count value or the second count value, generating a timer output that represents the attainment; calculating a difference value between the counted value and the second count value; and updating the first count value or the second count value to the difference value correspondingly to a magnitude relation between the difference value and the second count value. The above objects are achieved also by such a configuration.

In order to achieve the above objects, the timer processing method may comprise the processes of receiving a plurality of timer values relating to a plurality of timer requests to store the timer value for each timer request and storing into a storing unit a difference between a certain timer value and another timer value for each of the timer values; and setting the first count value or the second count value to the timer value or the difference value read from the storing unit. The timer processing method may comprise the process of, in case where the first count value or the second count value is updated to the difference value, notifying a timer request source of the update. The timer processing method may comprise the process of receiving a plurality of timer values relating to a plurality of timer requests, calculating a difference between a certain timer value and another timer value for each timer value, and storing the difference value into the storing unit for each of the timer values.

To achieve the above objects, a third aspect of the present invention provides an electronic apparatus that generates a timer output corresponding to a timer request and includes: a first count setting unit that sets a first count value relating to the timer request; a second count setting unit that sets a second count value relating to the timer request; a counter that counts the first count value or the second count value and, when the count value attains the first count value or the second count value, generates a timer output representing the attainment; and a calculating unit that calculates a difference value between the value counted by the counter and the second count value in the second count setting unit, and the first count value or the second count value is updated to the difference value to allow the counter to count, correspondingly to a magnitude relation between the difference value and the second count value. The above objects are also achieved according to such a configuration.

In order to achieve the above objects, the electronic apparatus may comprise a storing unit that receives a plurality of timer values relating to a plurality of timer requests to store the timer value for each timer request, the storing unit storing a difference between a certain timer value and another timer value for each of the timer values; and a timer setup processing unit that sets the first count value or the second count value to the timer value or the difference value read from the storing unit. The electronic apparatus may comprise notifying means, in case where the first count value or the second count value is updated to the difference value, notifying a timer request source of the update. The electronic apparatus may comprise a storing unit that receives a plurality of timer values relating to a plurality of timer requests to store the timer value for each timer request, the storing unit storing a difference between a certain timer value and another timer value for each of the timer values; and a timer request acceptance processing unit that calculates a difference between a certain timer value and another timer value for each of the timer requests to store the difference value into the storing unit for each of the timer values.

The features and advantages of the present invention are listed as follows.

(1) Efficient timer generation can be performed.

(2) The start and switching of the timer operation can be achieved even when a response speed is low in a CPU for a timer request.

(3) Consumption currents of a CPU can be reduced.

Other objects, features, and advantages of the present invention will be more apparent by reference to the accompanying drawings and each embodiment.

BRIEF DESCRIPTION OF THE DRAWINGS

FIG. 4 shows a timer value table when registering a timer value;

FIG. 5 shows a timer value table when adding a timer value;

DETAILED DESCRIPTION OF THE PREFERRED EMBODIMENTS

First Embodiment

Figure 1:
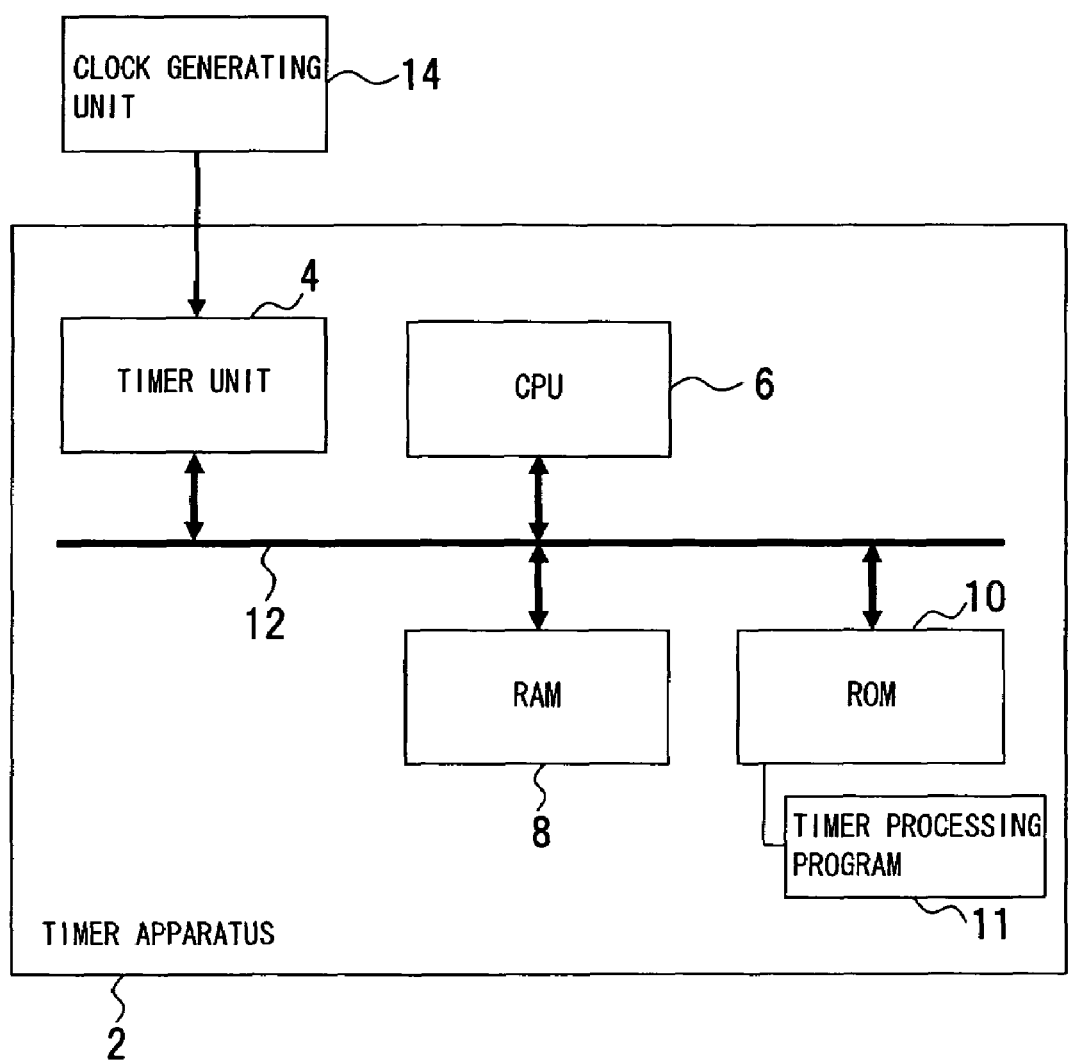
FIG. 1 shows a configuration example of a timer apparatus according to a first embodiment.

A timer apparatus according to a first embodiment of the present invention will be described with reference to FIGS. 1 and 2. FIG. 1 shows a configuration example of the timer apparatus and FIG. 2 shows a configuration example of a timer unit.

This timer apparatus 2 installed in an electronic apparatus such as a portable terminal apparatus, accepts various timer requests requested due to execution of an application program, and generates timer outputs. The timer apparatus 2 includes a hardware timer unit (hereinafter, "timer unit") 4, a CPU (central processing unit) 6, a RAM (Random-Access Memory) 8, a ROM (Read-Only Memory) 10, etc., which are connected through a bus 12.

The timer unit 4 receives a clock signal from a clock generating unit 14 and is controlled by the CPU 6 to generate the timer output correspondingly to the timer request associated with execution of various application programs by the CPU 6. The CPU 6 executes various programs stored in the ROM 10. The ROM 10 stores a timer processing program 11 according to the present invention as well as various application programs, etc. The RAM 8 is constituted by a nonvolatile memory, etc., is used for a work area, etc. of the timer unit 4, and is provided with a timer value table 32 (FIG. 3) in this embodiment.

Figure 2:
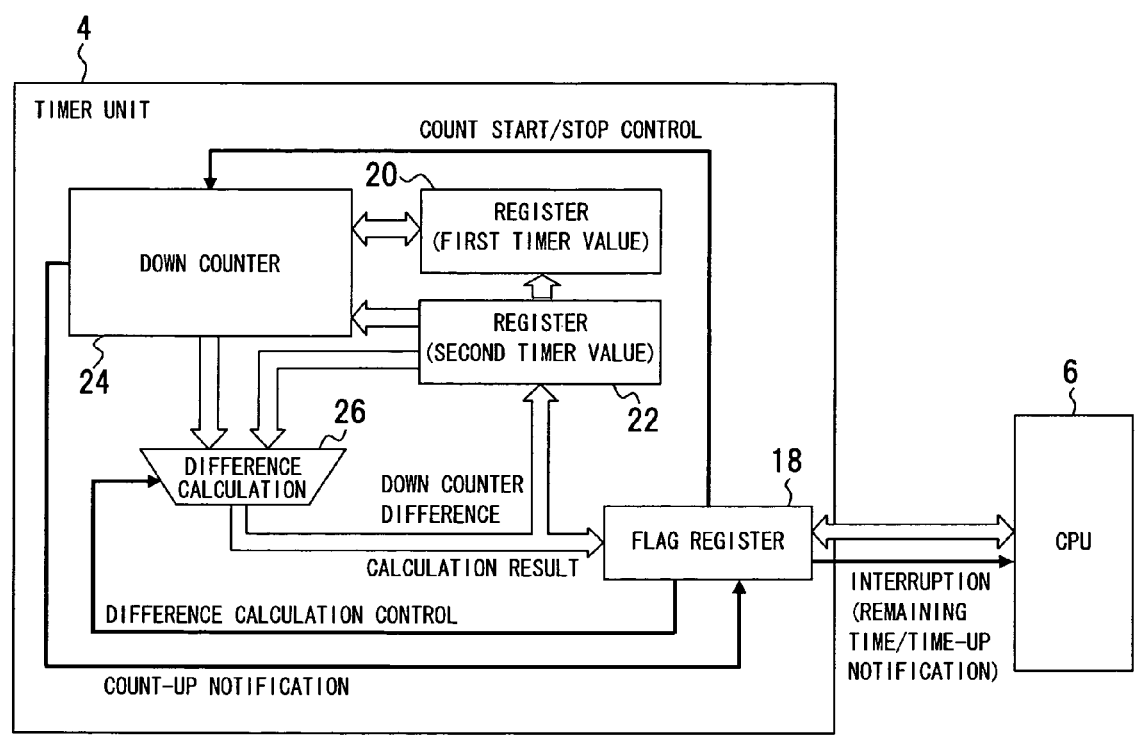
FIG. 2 shows a configuration example of a timer unit.

As shown in FIG. 2, the timer unit 4 includes a flag register 18 that is time-up notifying means, a register 20 that is a first count setting unit, a register 22 that is a second count setting unit, a down counter 24 that is an example of a counter, and a calculating unit 26 that is difference calculating means. The flag register 18 accepts a timer request from the CPU 6, performs count-start and count-stop control for the down counter 24, performs difference calculation control for the calculating unit 26, accepts a count-up notification from the down counter 24, and generates a remaining time and a time-up notification, which are interruptions in the process of the CPU 6. The register 20 manages a first timer value described later, which is a first count value, and the register 22 manages a second timer value described later, which is a second count value. The down counter 24 counts down the first timer value or second timer value and the calculating unit 26 calculates a difference between the count value of the down counter 24 and the second timer value, notifies the flag register 18 of the calculation result, and notifies the register 22 of a down counter difference value.

Figure 3:
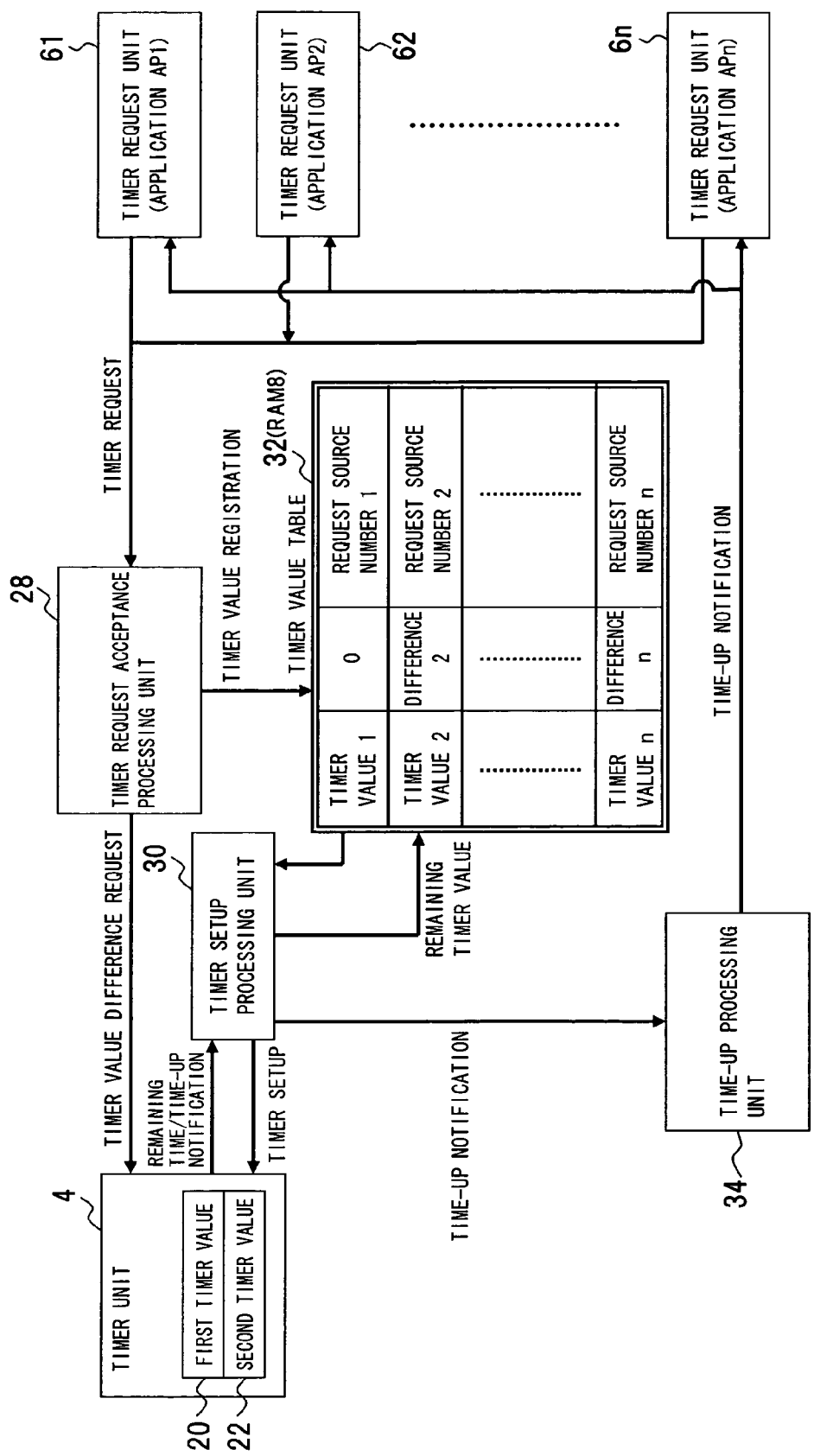
FIG. 3 shows an operation outline of a timer process.

An operation outline of a timer generation process will be described with reference to FIG. 3. FIG. 3 shows an operation outline of a timer generation process.

Since the CPU 6 processes a plurality of application programs AP1, AP2, . . . , APn and generates timer requests necessary for the processes, timer requesting units 61, 62, . . . , 6n are constituted by the application programs AP1, AP2, . . . , APn executed by the CPU 6. The timer request from the timer requesting units 61, 62, . . . , 6n is received by a timer request acceptance processing unit 28; the timer request acceptance processing unit 28 notifies the timer unit 4 of a timer value difference request; and the timer unit 4 notifies a timer setup processing unit 30 of a remaining time or time-up.

The timer value table 32 is established in the RAM 8 and a plurality of timer values 1, 2, . . . , n is set in the timer value table 32 by timer value registration from the timer request acceptance processing unit 28. The timer setup processing unit 30 is notified of the timer values 1 to n from the timer value table 32 and the timer value table 32 is notified of a remaining timer value from the timer setup processing unit 30. A time-up notification issued by the timer setup processing unit 30 is used by a time-up processing unit 34 and a time-up notification is issued from the time-up processing unit 34 to the timer requesting units 61 to 6n.

In these processes, a new timer request is issued by the execution or generation process of the application AP1 to APn from each timer requesting unit 61 to 6n and is received by the timer request acceptance processing unit 28, and each timer generation process is executed in a timer operation state. Description will be made of each operation aspect.

(1) When Timer Operation is Not Performed

The timer request acceptance processing unit 28 performs the timer value registration at the beginning of the timer value table 32 in the RAM 8, and the timer value is subsequently set in the timer unit 4. The timer unit 4 performs countdown in accordance with a basic timing T, for example, T=10 [msec], and gives notification to the timer setup processing unit 30 in the case of count-up. This notification is performed by interruption for the timer setup processing unit 30.

(2) When New Timer Request is Received During Timer Operation

If the timer request is, for example, a new timer request of a timer value="0001", the timer unit 4 is queried for a remaining time. If the timer unit 4 is queried, an interruption notification of the remaining time is issued at the next basic timing T from the timer unit 4 to the timer setup processing unit 30. The timer setup processing unit 30 issues the time-up notification through the time-up processing unit 34 to a relevant unit of the timer request, among the timer requesting unit 61 to 6n.

(3) When Timer Value Td of Timer Request is Longer than Timer Value Ta During Timer Operation (Ta<Td)

If the timer value table 32 is referenced during the timer operation and the received timer request has a timer value Td longer than an active timer value Ta, a query for a remaining time is issued to the timer unit 4. When receiving this query, the timer unit 4 interrupts and notifies the timer setup processing unit 30 of the remaining time at the next basic timing T. The timer setup processing unit 30 subtracts the remaining time from the requested timer value and the timer difference value is registered into the timer value table 32. If a plurality of timer requests is registered in the timer value table 32, the subtraction is sequentially performed for each remaining timer value, which is registered before a timer value with a remaining timer smaller than the timer value of the timer value table 32.

(4) When Timer Value Td of Timer Request is Shorter than Timer Value Ta During Timer Operation (Td<Ta)

If the received timer request has the timer value Td shorter than the active timer value Ta during the timer operation, a new timer request value is set at the timer unit 4. The timer unit 4 compares the remaining time of the active timer value and the timer value relating to the new request at the next basic timing after the new request is set. The operation in this case is as follows.

a. When Newly Set Timer Value Td is Longer than Remaining Time Tr of Active Timer Value (Td>Tr)

The timer setup processing unit 30 is interrupted and notified of the continuation notification and the remaining timer value of the active timer operation. The timer setup processing unit 30 subtracts the remaining timer value from the timer value Td of the timer request relating to the new setup to calculate a timer difference, and the difference is registered into the timer value table 32.

b. When Remaining Time Tr of Active Timer is Longer than Newly Set Timer Value Td (Tr>Td)

The timer setup processing unit 30 is interrupted and notified of the switching notification and the remaining timer value of the active timer operation. The timer setup processing unit 30 registers the new timer request for a leading registration value of the timer value table 32 and registers at the second position of the timer value table 32 the active timer value that has been at the beginning. However, with regard to the active timer value, the timer value is a timer difference value obtained by subtracting the timer value of the new timer request from the remaining timer value.

c. When Remaining Time Tr of Active Timer value is Equal to Newly Set Timer Value Td (Tr=Td)

The timer setup processing unit 30 is interrupted and notified of the continuation notification and the remaining time of the active timer value. Since the remaining timer value is equal to the timer value of the new timer request, the timer setup processing unit 30 determines that the remaining time Tr of the active timer value is equal to the newly set timer value Td and registers into the timer value table 32 the timer value of the new timer request, i.e., a difference value=0. The timer setup processing unit 30 sets the next timer value in the timer unit 4 to a value that has been set without change.

Details of the process of the timer value table will be described with reference to FIGS. 4 and 5. FIG. 4 shows the timer value table when registering a timer value and FIG. 5 shows the timer value table when adding a timer value.

(1) First, when the timer operation is suspended, if a timer request 1 is issued, the timer value table 32 stores a timer value 1, a difference=0 (default value), and a request source number 1 for a timer I. The timer value, difference, and request source number are defined as follows.

The timer value is a requested timer value.

The difference is a difference with the last timer value registered into the timer value table 32.

The request source number is a task number of a timer request source.

(2) When a timer request 2 (timer value 2) is issued during the operation of the timer I, a query is performed for the remaining time of the active timer, and if the timer value 2 is longer than the remaining time, a timer value 2, a difference 2 (timer value 2−remaining time), and a request source number 2 are stored at a second position (position of a timer II) of the timer value table 32.

(3) When a timer request 4 (timer value 4) is issued during the operation of the timers I and II, a query is performed for the remaining time of the active timers, and if the timer value 4 is longer than the remaining time, a difference 4=timer value 4−remaining time, is calculated. The difference 4 is compared with the difference 2 of the timer II and, in the case of difference 4≧difference 2, the difference 4=difference 4−difference 2, is calculated. As shown in FIG. 4, the timer request is registered at a position of a timer IV of the timer value table 32 (at the timer of the registration of the timer IV).

(4) When a timer request 3 (timer value 3) is issued during the operation of the timers I, II, and III, a query is performed for the remaining time of the operation, and if the timer value 3 is longer than the remaining time, a difference 3=timer value 3−remaining time is calculated. The difference 3 is compared with the difference 2 of the timer II and, in the case of difference 3≧difference 2, the difference 3=difference 3−difference 2, is calculated. The difference 3 is compared with the difference 4 of the timer IV and, in the case of difference 3<difference 4, a timer III is inserted between the timer II and the timer IV on the timer value table 32 as shown in FIG. 5. The difference 4=difference 4−difference 3, is calculated to update the difference 4 on the timer value table 32.

(5) Similarly, if the timer value of the timer request is smaller than the active timer value (registered on the timer value table 32), a difference of the timer value is calculated and the timer registration is performed at a position corresponding to the order of the difference.

Figure 6:
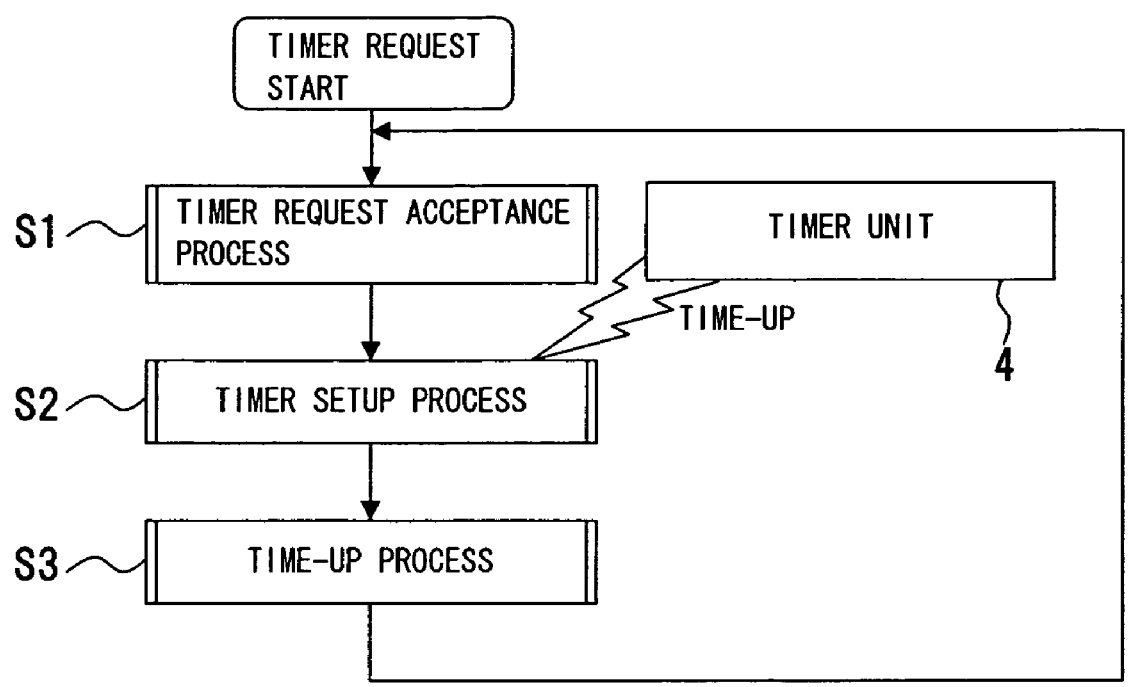
FIG. 6 is a flowchart of a process procedure of the timer process.

A timer generation process will be described with reference to FIG. 6. FIG. 6 is a flowchart of a process procedure of the timer generation process.

When the timer processing program is launched, the timer generation process is executed which is a main routine. In the timer generation process, a timer request acceptance process (step S1), a timer setup process (step S2), and a time-up process (step S3) are performed based on the timer request initiation. The timer setup process is performed by the timer unit 4.

Figure 7:
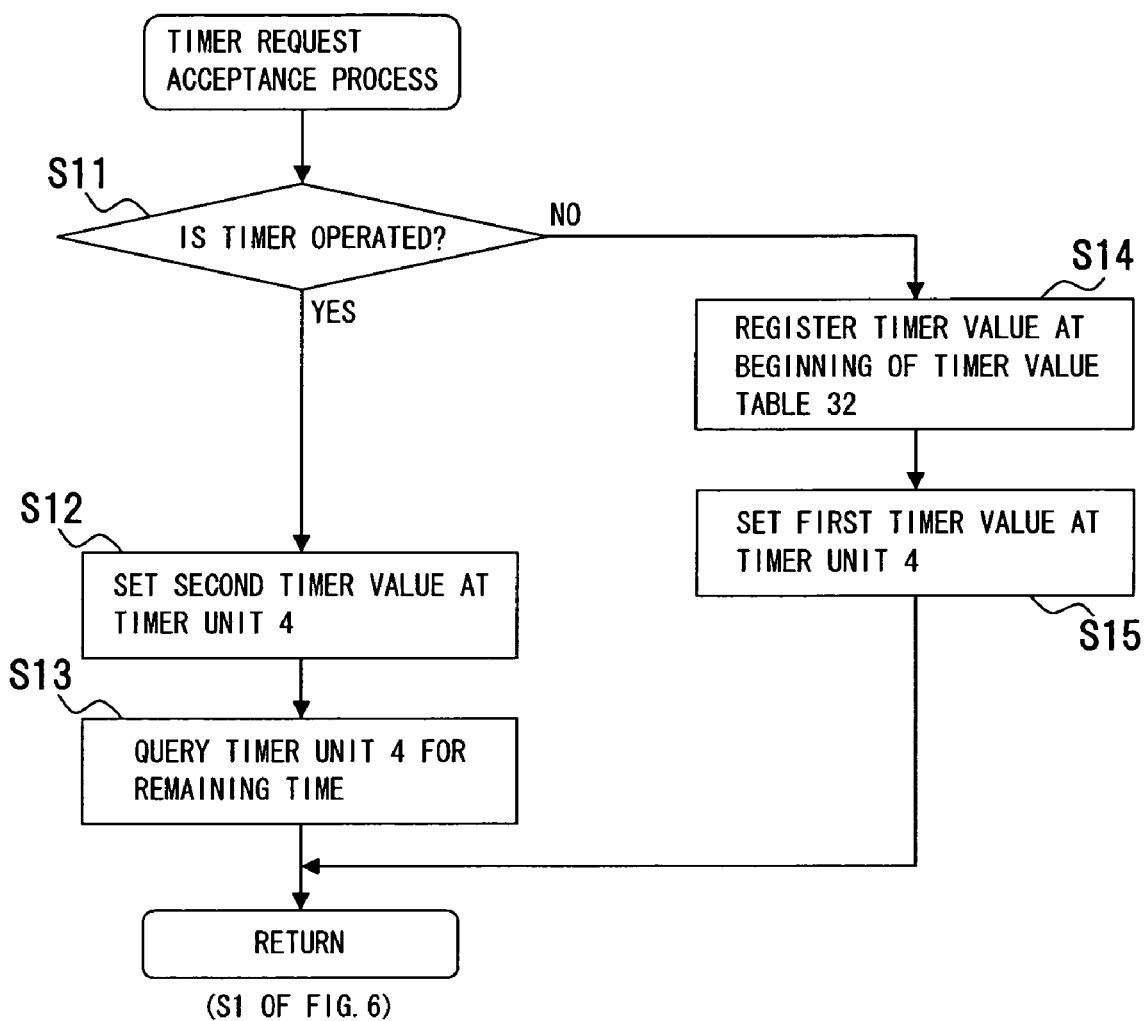
FIG. 7 is a flowchart of a process procedure of a timer request acceptance process.

The timer request acceptance process will be described with reference to FIG. 7. FIG. 7 is a flowchart of a process procedure of the timer request acceptance process.

In the timer request acceptance process, when a timer request is accepted, it is determined whether a timer is operated or not (step S11); if a timer is operated (YES at step S11), the second timer value is set at the timer unit 4 (step S12); the timer unit 4 is queried for the remaining time (step S13); and this process is terminated and returned to step S1 (FIG. 6).

When a timer request is accepted, if a timer is not operated (NO at step S11), a timer value is set for the leading value of the timer value table 32 (step S14); the first timer value is set at the timer unit 4 (step S15); and this process is terminated and returned to step S1 (FIG. 6).

Figure 8:
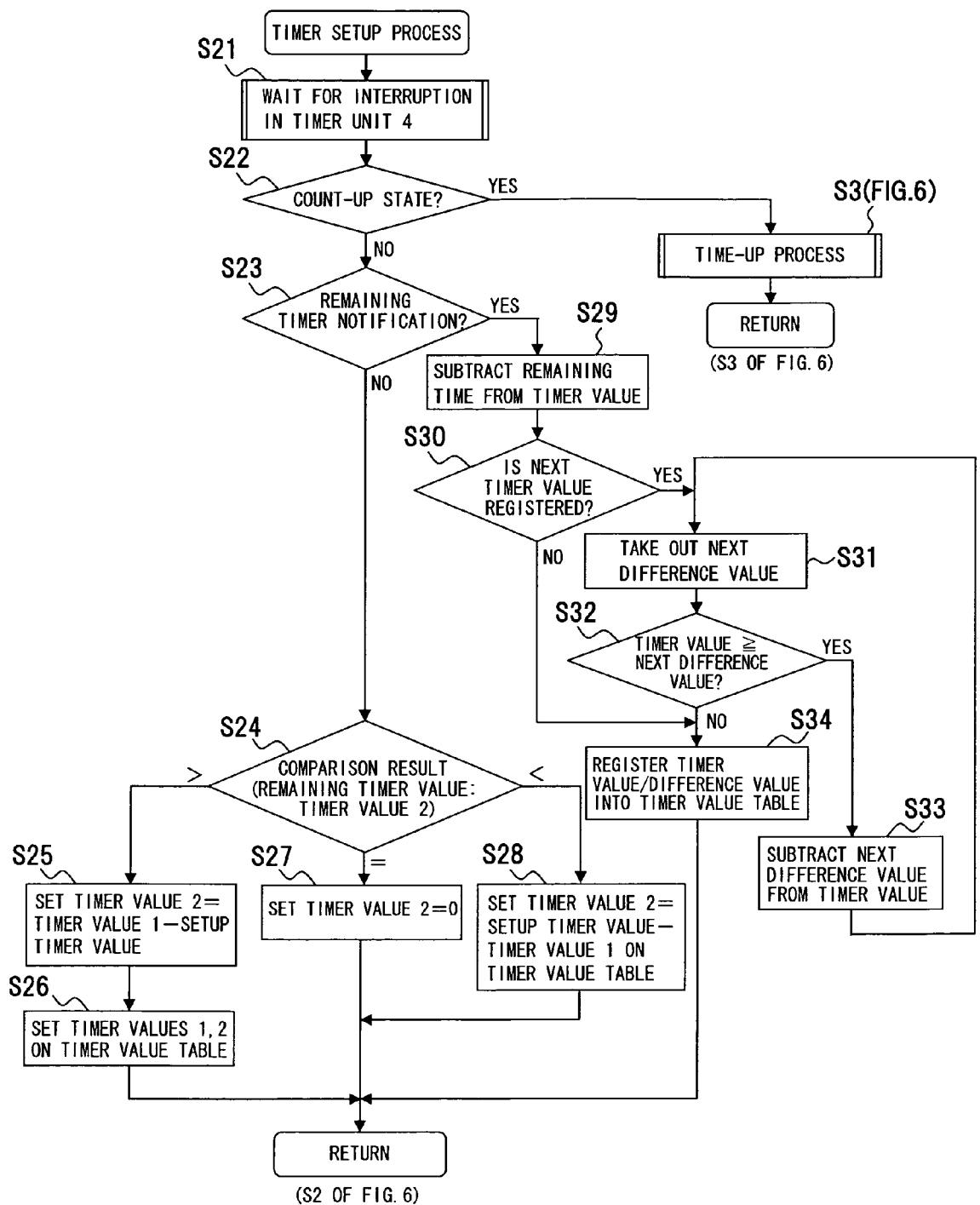
FIG. 8 is a flowchart of a process procedure of a timer setup process.

The timer setup process will be described with reference to FIG. 8. FIG. 8 is a flowchart of a process procedure of the timer setup process.

In the timer setup process, after waiting for the interruption in the timer unit 4 (step S21), it is determined whether the timer unit 4 is in the count-up state or not (step S22) and, if the timer unit 4 is in the count-up state (YES at step S22), the procedure is returned to the time-up process (step S3, FIG. 6).

If the timer unit 4 is not in the count-up state (NO at step S22), it is determined whether the notification of the remaining time is performed or not (step S23); if the notification of the remaining time is not performed (NO at step S23), the remaining timer value is compared with the timer value 2 (step S24); if the remaining timer value is greater than the timer value 2 (remaining timer value>timer value 2), the setting of (timer value 2=timer value 1−setup timer value) is performed for the timer value 2 (step S25); the timer values 1 and 2 are set on the timer value table 32 (step S26); and the procedure is returned to step S2 (FIG. 6).

If the remaining timer value is equal to the timer value 2 (remaining timer value=timer value 2), the setting of the timer value 2=0, is performed (step S27), and the procedure is returned to step S2 (FIG. 6).

If the remaining timer value is smaller than the timer value 2 (remaining timer value<timer value 2), the setting of (timer value 2=setup timer value−timer value 1) is performed on the timer value table 32 for the timer value 2 (step S28) and the procedure is returned to step S2 (FIG. 6).

If the notification of the remaining time is performed (Yes at step S23), the remaining time is subtracted from the timer value (step S29); it is determined whether the registration of the next timer value is performed or not (step S30); if the registration of the next timer value is performed (YES at step S30), the next difference value is taken out (step S31); it is determined for the timer value whether (timer value ≧next difference value) is correct or not (step S32); if (timer value≧next difference value) is correct (YES at step S32), the next difference value is subtracted from the timer value (step S33); the next difference value is taken out (step S31); and the procedure goes to the determination at step S32.

If (timer value≧next difference value) is not correct (NO at step S32), the timer value and the difference value are registered on the timer value table 32 (step S34) and the procedure goes to step S2 (FIG. 6). In this case, if the registration of the next timer value is not performed at step S30, the procedure is also returned through step S34 to step S2 (FIG. 6).

Figure 9:
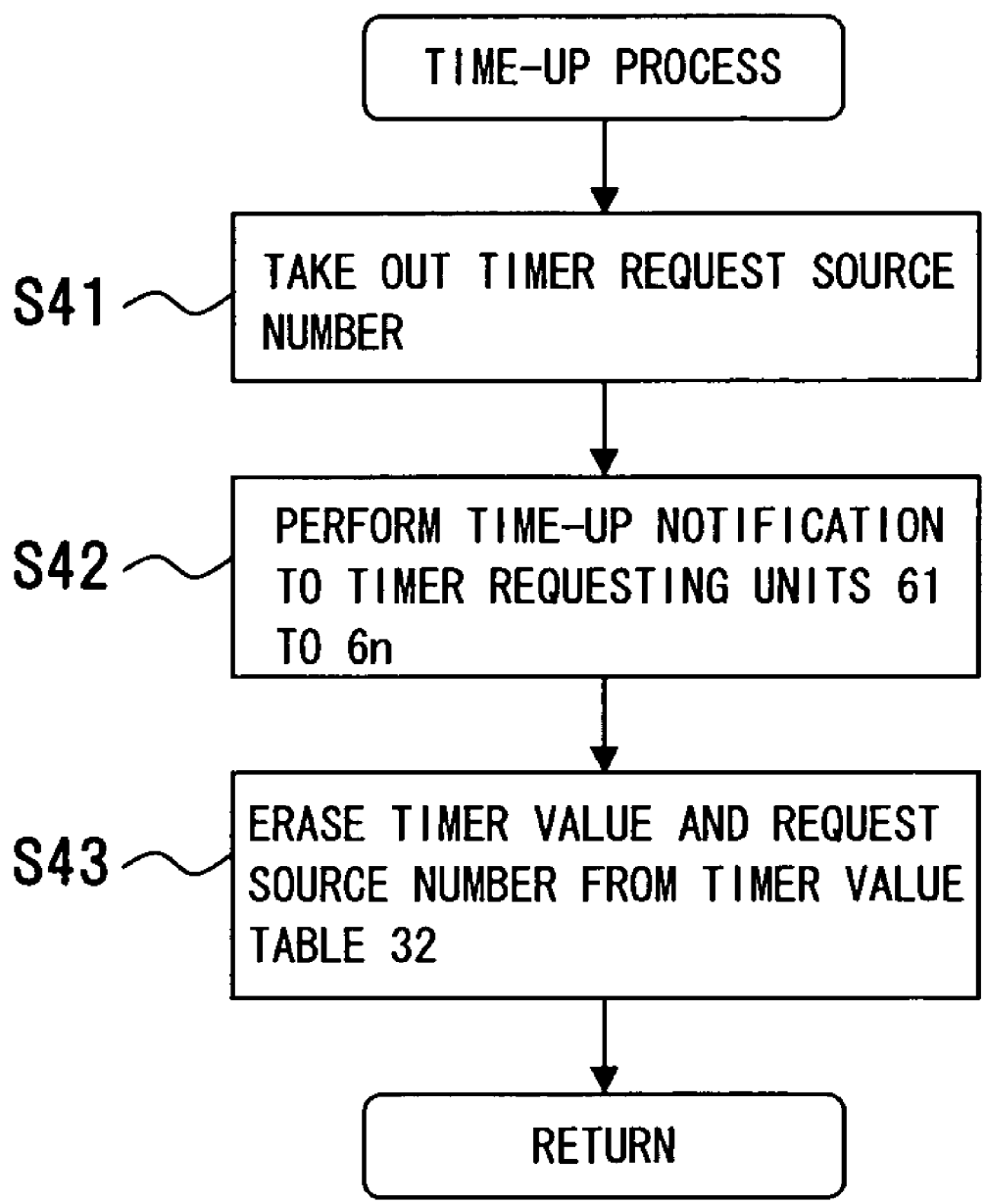
FIG. 9 is a flowchart of a process procedure of a time-up process.

The time-up process will be described with reference to FIG. 9. FIG. 9 is a flowchart of a process procedure of the time-up process.

In the time-up process (step S3, FIG. 6), the timer request source number is taken out (step S41); the time-up notification is sent to the timer requesting units 61 to 6n (step S42); the timer value and the request source number is erased from the timer value table 32 (step S43); and the procedure is returned to step S3 (FIG. 6) to wait for the next timer request.

Figure 10:
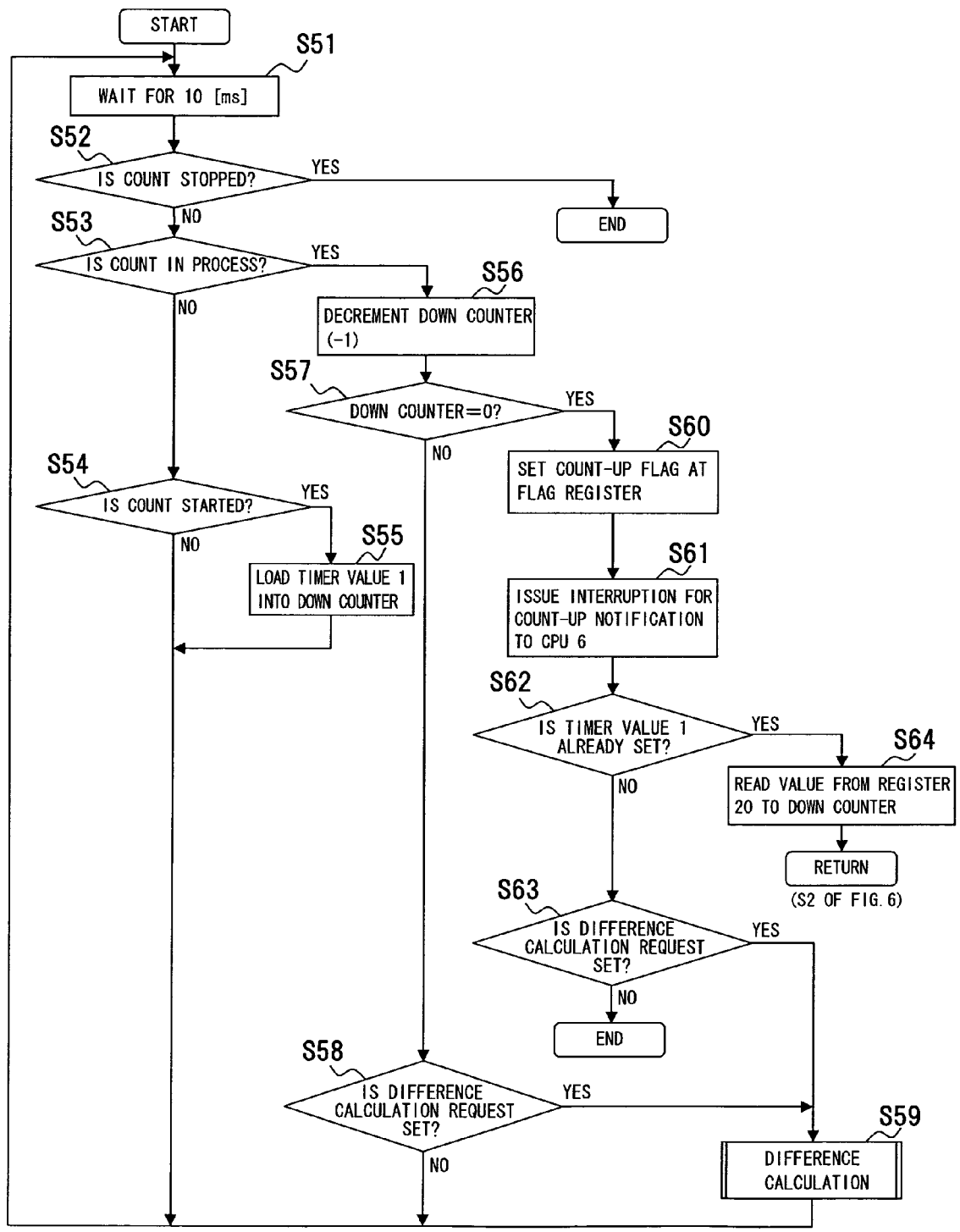
FIG. 10 is a flowchart of operation of the timer unit.

The operation of the timer unit will be described with reference to FIG. 10. FIG. 10 is a flowchart of the operation of the timer unit.

The timer unit 4 waits for a predetermined time period of the basic timing, for example, 10 [msec] (step S51); it is determined whether the count is stopped or not (step S52); and if the count is stopped (YES at step S52), this process is terminated.

If the count is not stopped (NO at step S52), it is determined whether the count is in process or not (step S53); if the count is not in process (No at step S53), it is determined whether the count is started or not (step S54); if the count is started (YES at step S54), the down counter 24 loads the timer value 1 (step S55); and the procedure is returned to step S51. In this case, if the count is not started (NO at step S54), the procedure is also returned to step S51.

If the count is in process at step S53 (YES at step S53), the down counter 24 is decremented (−1) (step S56); it is determined whether or not the count value of the down counter 24 becomes zero as a result of this subtraction (step S57); if the count value is not zero (NO at step S57), it is determined whether a difference calculation request is set or not (step S58); if the difference calculation request is not set (NO at step S58), the procedure is returned to step S51; if the difference calculation request is set (YES at step S58), the difference calculation process is performed (step S59); and the procedure is returned to step S51.

If the count value of the down counter 24 is zero (YES at step S57), a count-up flag is set at the flag register 18 (step S60); the interruption for the count-up notification is issued to the CPU 6 (step S61); it is determined whether the timer value 1 has been set or not (step S62); if the timer value 1 has not been set (NO at step S62), it is determined whether a difference calculation request is set or not (step S63); if the difference calculation request is not set (NO at step S63), this process is terminated.

If the timer value 1 has been set (YES at step S62), the down counter 24 reads the value from the register 20 (step S64) and the procedure is returned to the timer setup process (step S2 of FIG. 6).

If the difference calculation request is set (YES at step S63), the difference calculation process is performed (step S59), and the procedure is returned to step S51.

Figure 11:
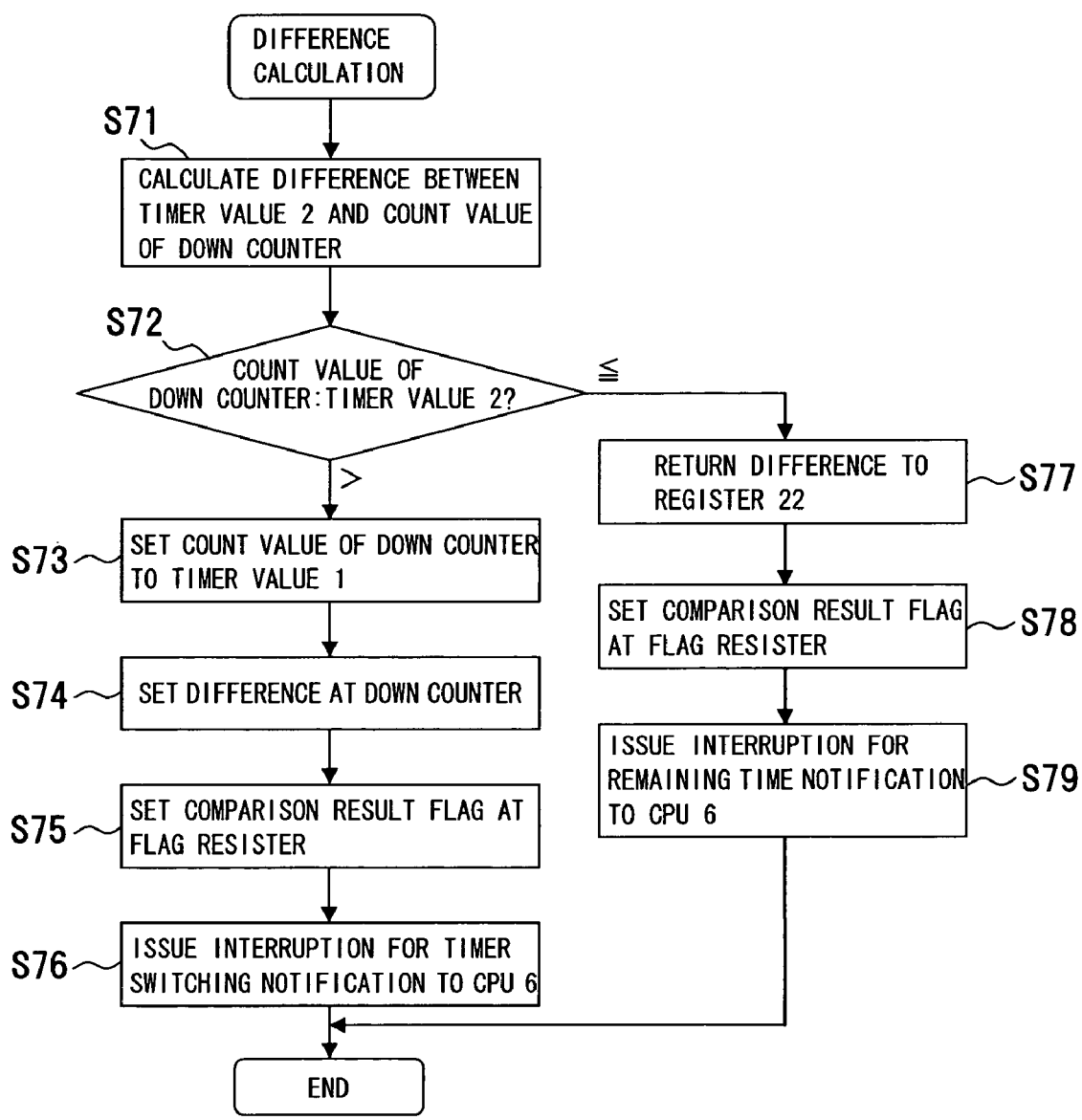
FIG. 11 is a flowchart of a process procedure of a difference calculation process.

The difference calculation process will be described with reference to FIG. 11. FIG. 11 is a flowchart of a process procedure of the difference calculation process.

In the difference calculation process, a difference is calculated between the timer value 2 and the count value of the down counter 24 (step S71); the count value of the down counter 24 is compared with the timer value 2 (step S72); if the count value of the down counter 24 is larger the timer value 2, the count value of the down counter 24 is set to the timer value 1 (step S73); and the difference is set at the down counter 24 (step S74). A comparison result flag is set at the flag register 18 (step S75); the interruption for the timer switching notification is issued to the CPU 6 (step S76); and this process is terminated.

If the count value of the down counter 24 is equal to or smaller than the timer value 2, the difference is returned to the register 22 (step S77), a comparison result flag is set at the flag register 18 (step S78); the interruption for the remaining time notification is issued to the CPU 6 (step S79); and this process is terminated.

Figure 12:
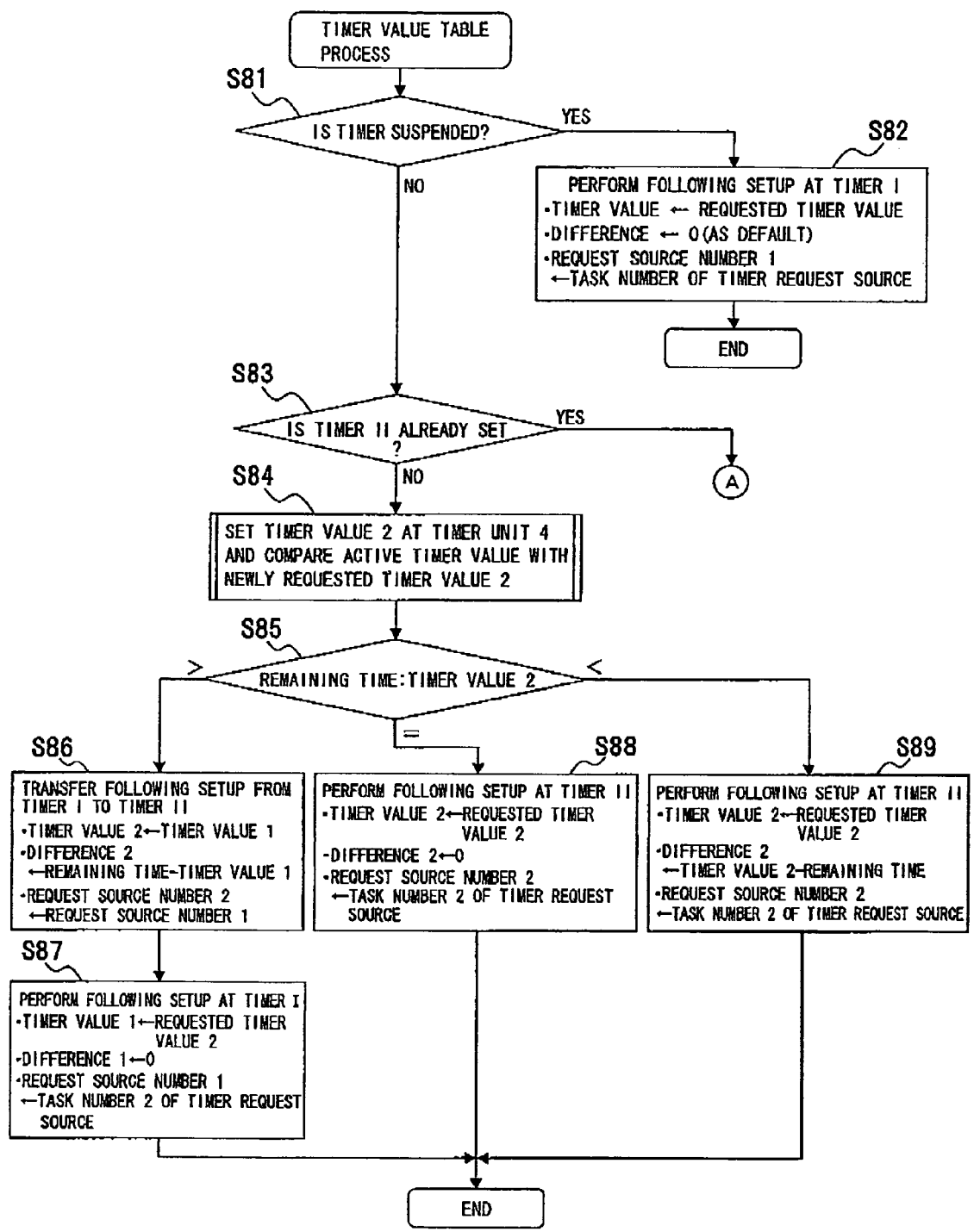
FIG. 12 is a flowchart of a process procedure of a timer value table process.
Figure 13:
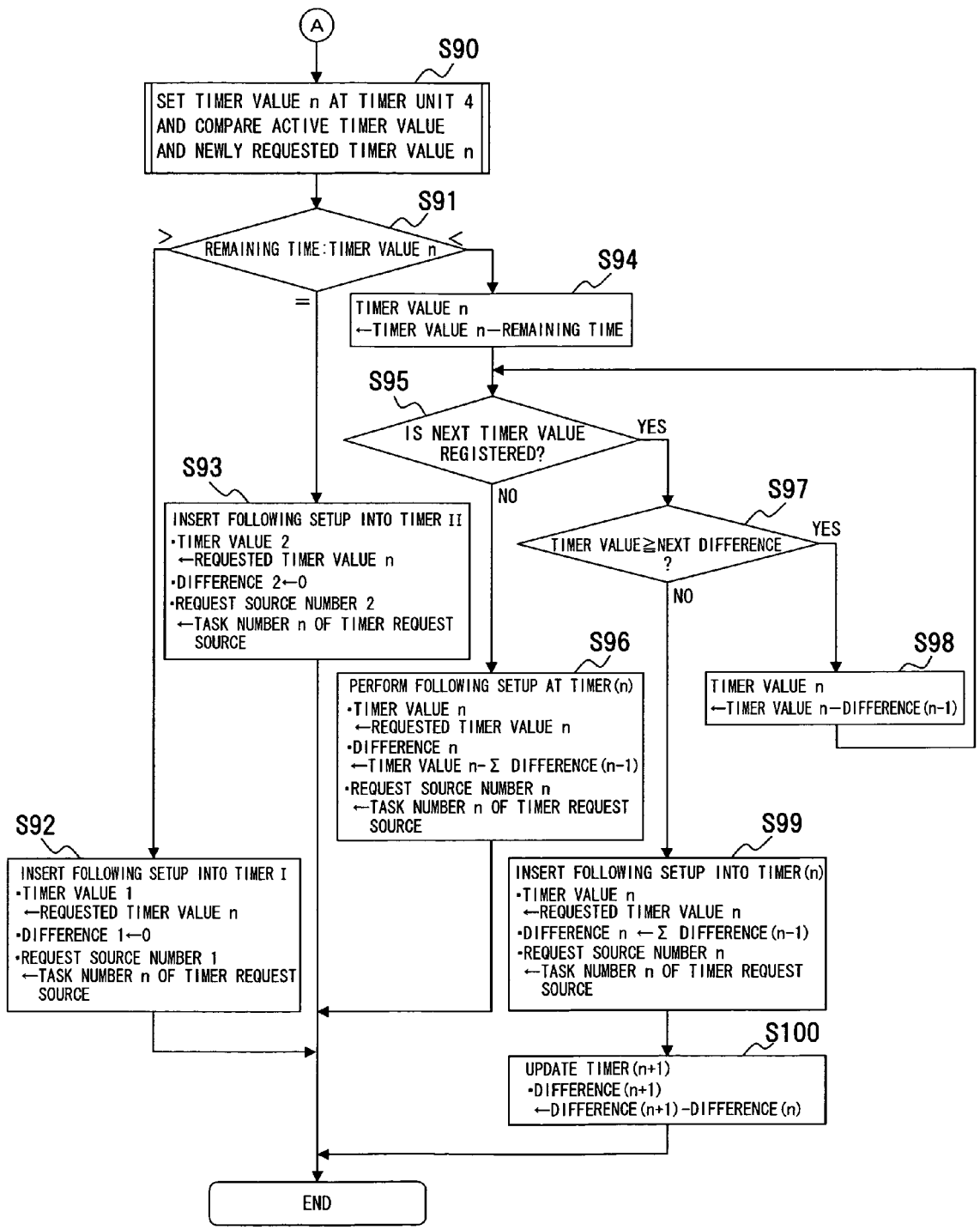
FIG. 13 is a flowchart of a process procedure of the timer value table process.

The timer value table process will be described with reference to FIGS. 12 and 13. FIGS. 12 and 13 are flowcharts of a process procedure of the timer value table process. In FIGS. 12 and 13, A is a linking point.

In the timer value table process, it is determined whether the timer operation is suspended or not (step S81), and if the timer operation is suspended (YES at step S81):

the setting of the requested timer value to the timer value;
the setting of zero (=default value) to the difference; and
the setting of the task number of the timer request source to the request source number 1 are performed in the timer I (step S82) and this process is terminated.

If the timer operation is not suspended (NO at step S81), it is determined whether the timer II has been set or not (step S83), and if the timer II has not been set (NO at step S83), the timer value 2 is set at the timer unit 4 and the active timer value is compared with the newly requested timer value 2 (step S84).

In the comparison process between the active timer value and the newly requested timer value 2, the remaining time is compared with the timer value 2 (step S85) and if the remaining time is larger than the timer value 2 (remaining time>timer value 2):

the setting of the timer value 1 to the timer value 2;
the setting of (remaining time−timer value 1) to the difference 2; and
the setting of the request source number 1 to the request source number 2 are performed from the timer I to the timer II (step S86), and in the timer I:

the setting of the requested timer value 2 to the timer value 1;
the setting of zero to the difference 1; and
the setting of the task number 2 of the timer request source to the request source number 1 are performed (step S87) to terminate this process.

If the remaining time is equal to the timer value 2 at step S85 (remaining time=timer value 2):

the setting the requested timer value 2 to of the timer value 2;
the setting of zero to the difference 2; and
the setting of the task number 2 of the timer request source to the request source number 2 are performed in the timer II (step S88) and this process is terminated.

If the timer value 2 is larger than the remaining time at step S85 (remaining time<timer value 2):

the setting of the requested timer value 2 to the timer value 2;
the setting of (timer value 2−remaining time) to the difference 2; and
the setting of the task number 2 of the timer request source to the request source number 2 are performed in the timer II (step S89) and this process is terminated.

If the timer 2 has been set (YES at step S83), the procedure goes to step S90 of FIG. 13; at step S90, a timer value n is set at the timer unit 4; and the active timer value is compared with the newly requested timer value n.

In this case, in the comparison process between the active timer value and the newly requested timer value n, the remaining time is compared with the timer value n (step S91) and if the remaining time is larger than the timer value n (remaining time>timer value n):

the setting of the requested timer value n to the timer value 1;

the setting of zero to the difference 1; and the setting of the task number n of the timer request source to the request source number 1 are performed in the timer I (step S92) and this process is terminated.

If the remaining time is equal to the timer value n (remaining time=timer value n):

the setting of the requested timer value n to the timer value 2;

the setting of zero to the difference 2; and the setting of the task number n of the timer request source to the request source number 2 are performed in the timer II (step S93) and this process is terminated.

If the timer value n is larger than the remaining time (remaining time<timer value n), (timer value n−remaining time) is set to the timer value n (step S94) and it is determined whether the next timer value is registered or not (step S95), and if the next timer value is not registered (NO at step S95):

the setting of the requested timer value n to the timer value n;

the setting of {timer value n−Σ difference (n−1)} to the difference n; and the setting of the task number n of the timer request source to the request source number n are performed in the timer (n) (step S96) and this process is terminated.

If the next timer value is registered (YES at step S95), it is determined whether (timer value≧next difference) is correct or not (step S97); if (timer value≧next difference) is correct (YES at step S97), {timer value n−difference (n−1)} is set to the timer value n (step S98); and the procedure is returned to step S95 to perform the process of steps S95, S96, and S97.

If (timer value≧next difference) is not correct at step S97 (NO at step S97):

the setting of the requested timer value n to the timer value n;

the setting of {timer value n−Σ difference (n−1)} to the difference n; and the setting of the task number n of the timer request source to the request source number n are performed in the timer (n) (step S99), and a timer (n+1) is updated by setting {difference (n+1)−difference (n)} to a difference (n+1) (step S100) to terminate this process.

Figure 14:
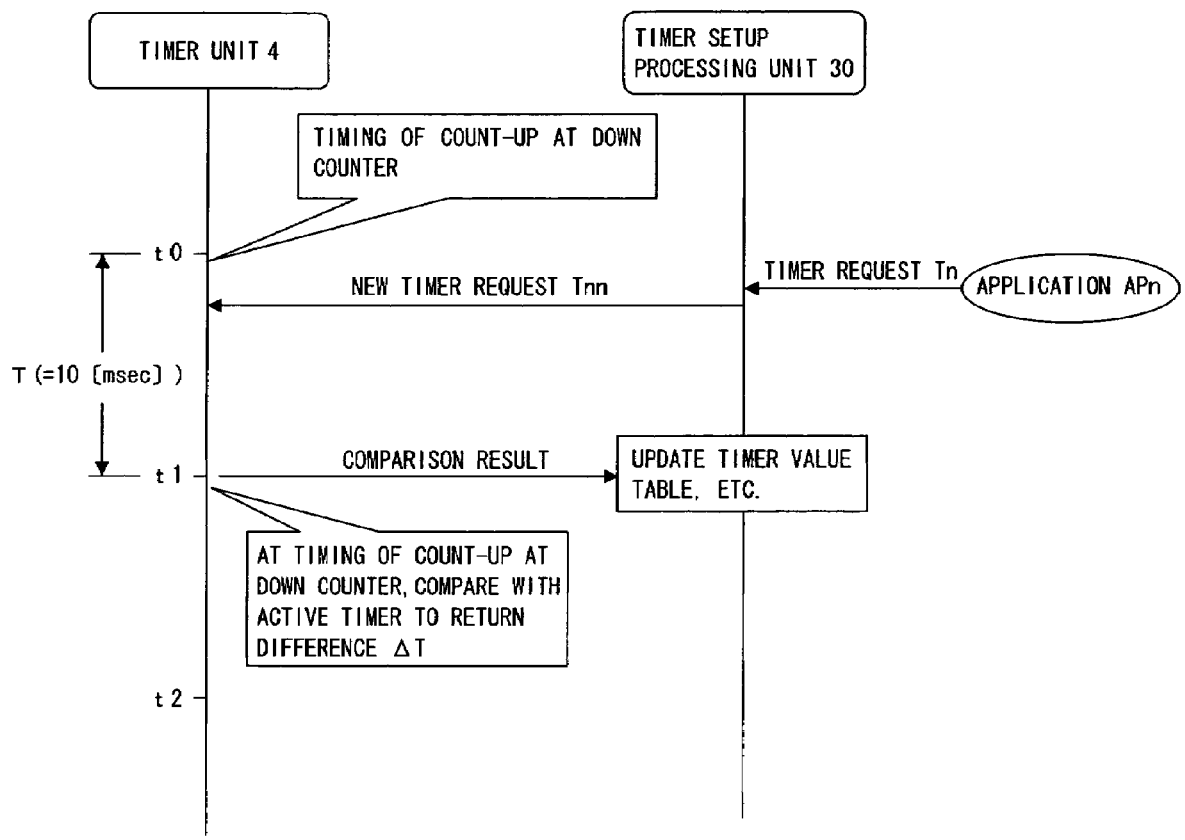
FIG. 14 shows a process sequence of a relationship between the timer unit and a CPU.

A timing relationship between the timer unit and the CPU will be described with reference to FIG. 14. FIG. 14 shows a process sequence of a relationship between the down counter of the timer unit 4 and the timer setup processing unit 30 of the CPU 6.

The timer unit 4 counts up at the basic terminal T (time interval) to generate timings t0, t1, t2, etc. In this case, the basic timing T is 10 [msec], for example.

To such timings in the timer unit 4, the timer setup processing unit 30 issues, for example, a timer request Tn from an application Apn in the task process of the CPU 6, and a corresponding new timer request Tnn is set at the timer unit 4. Correspondingly, at the timing of the count-up, the timer unit 4 compares the timer value during the timer operation and the timer value of the new timer request Tnn to calculate a difference ΔT between the both timer values, and the timer setup processing unit 30 is notified of the difference ΔT. The difference ΔT is used for updating the timer value table 32, etc. The time-up notification is then issued for the timer request.

Figure 15A:
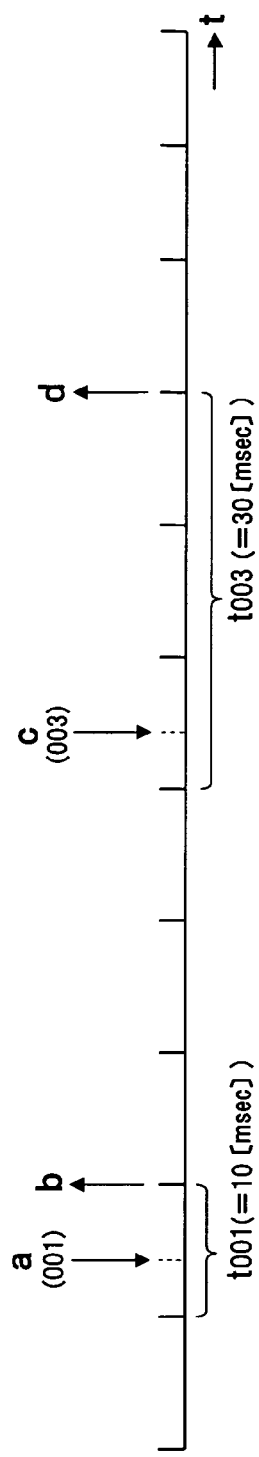
FIGS. 15A, 15B, and 15C show generation timings of time-up notifications for timer requests.
Figure 15B:
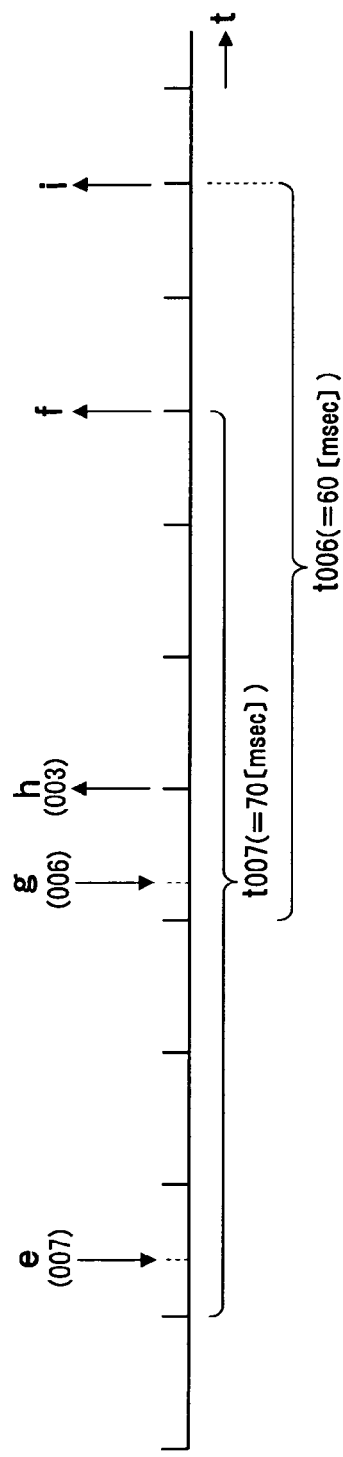
Figure 15C:
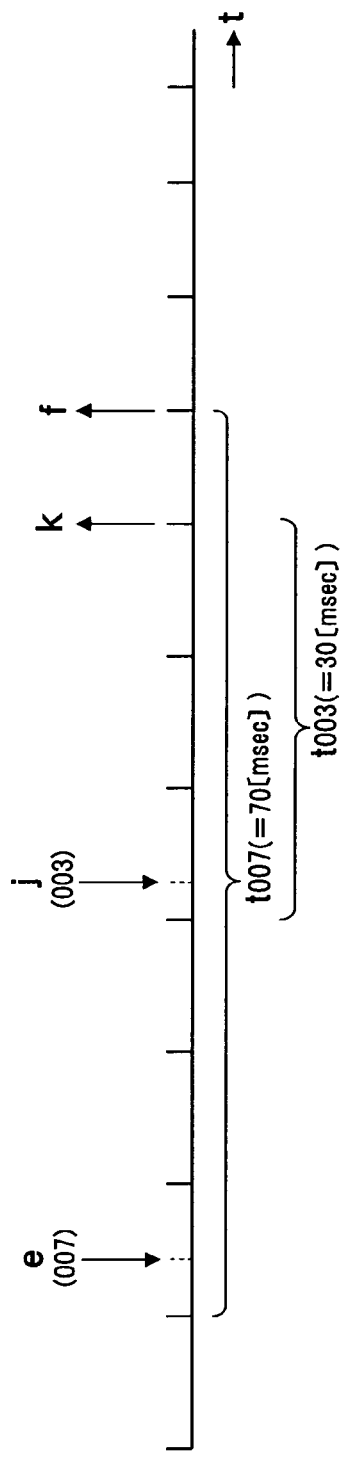

The timer request and time-up notification process will be described with reference to FIGS. 15A, 15B, and 15C. FIGS. 15A, 15B, and 15C show generation timings of the time-up notifications for the timer requests.

(1) When Timer Requests (001), (003) are Generated for Timer Values

As shown in FIG. 15A, when the basic timing T is set to, for example, the timing of 10 [msec], if a timer request a (001) is generated, a time-up notification b is issued, and if a timer request c (003) is subsequently generated, a time-up notification d is issued.

(2) When Another Timer Request is Generated During Timer Operation

As shown in FIG. 15B, when a timer request e (007) is generated, if a timer request g (006) is generated during the timer operation before a time-up notification f is issued, a remaining time notification h (003) is issued which represents a remaining time of 30 [msec] from the generation time point to the time-up notification f. As time elapses, after the time-up notification f is issued for the timer request e, a time-up notification i is issued for the timer request g. In this case, the remaining time (003) until the issuance of the time-up notification f is used for the time count of the time-up notification i, and the time-up notification i is obtained 20 [msec] after the time-up notification f.

As shown in FIG. 15C, if a timer request j (003) is generated during the timer operation for the timer request e (007), a time-up notification k is issued for the timer request j as time elapses during a remaining time of 40 [msec] from the generation time point to the time-up notification f, and the time-up notification f is issued when time (001=10 [msec]) has elapsed from the time-up notification k.

Therefore, according to such a timer generation process, the consumption currents of the CPU 6 can be reduced and the clock of the CPU 6 can be operated at lower speed.

According to the above embodiment, the notification of the timer difference and the continuous timer counting are achieved by only one timer, which contributes to the reduction of the hardware scale, and since the next preset timer value is automatically set at the timing of the count-up, the interface with the CPU can be reduced; the switching of the timer operation, etc. can be performed efficiently even with a relatively low performance CPU; and highly practical timer generation can be performed.

Second Embodiment

Figure 16:
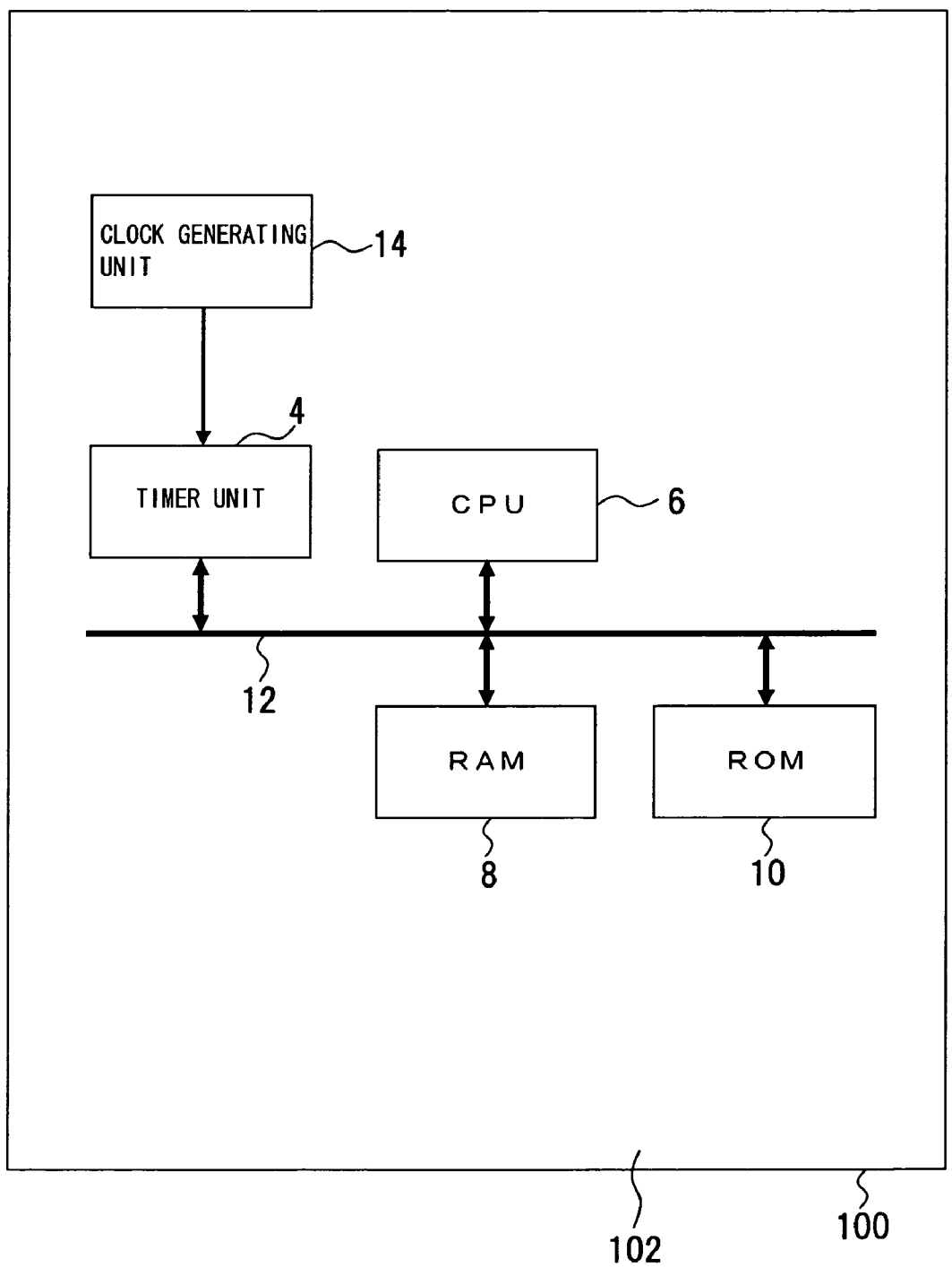
FIG. 16 shows a configuration example of a circuit apparatus according to a second embodiment.

A second embodiment of the present invention will be described with reference to FIG. 16. FIG. 16 shows a configuration example of a circuit apparatus. In FIG. 16, the same numerals are added to the same portions as FIG. 1.

This circuit apparatus 100 is mounted to an electronic apparatus such as a portable terminal apparatus that needs timings corresponding to a plurality of task processes. The circuit apparatus 100 includes at least the timer unit 4 of the aforementioned timer apparatus 2 (the first embodiment) for a functioning unit on a circuit substrate 102. Functioning units such as the CPU 6, RAM 8, and ROM 10 may be included in the timer apparatus 2 due to the configuration of the electronic apparatus, or a CPU, RAM, ROM, etc. installed in the electronic apparatus may be used. Other functioning units may be also installed.

According to the circuit apparatus 100 with such a configuration, the functions can be achieved as described in the first embodiment; the timings corresponding to a plurality of task processes can be efficiently generated; and the alleviation of the task process lord can be achieved, such as the reduction of the consumption currents of the CPU.

Third Embodiment

Figure 17:
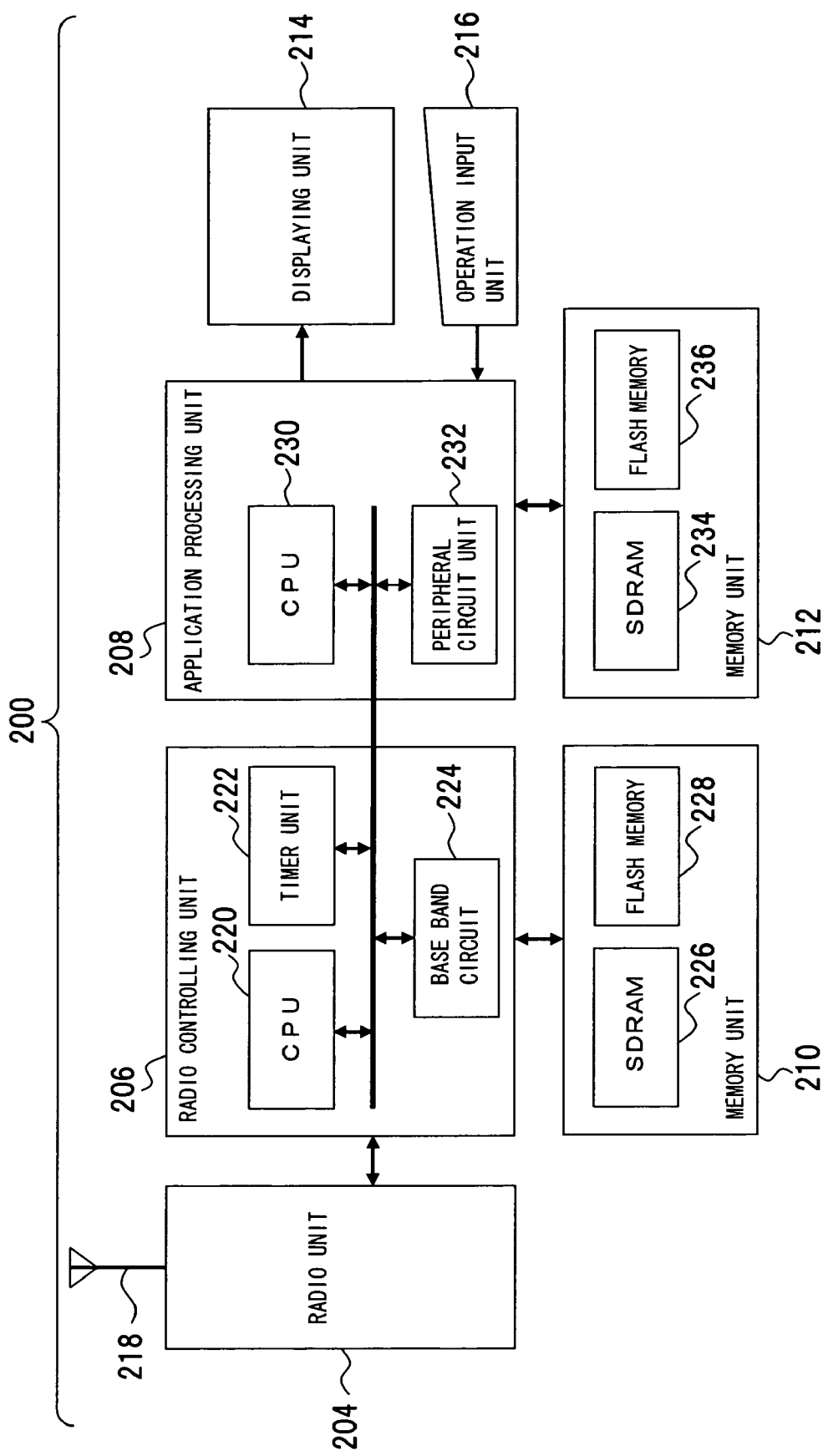
FIG. 17 shows a configuration example of a portable terminal apparatus according to a third embodiment.
Figure 18:
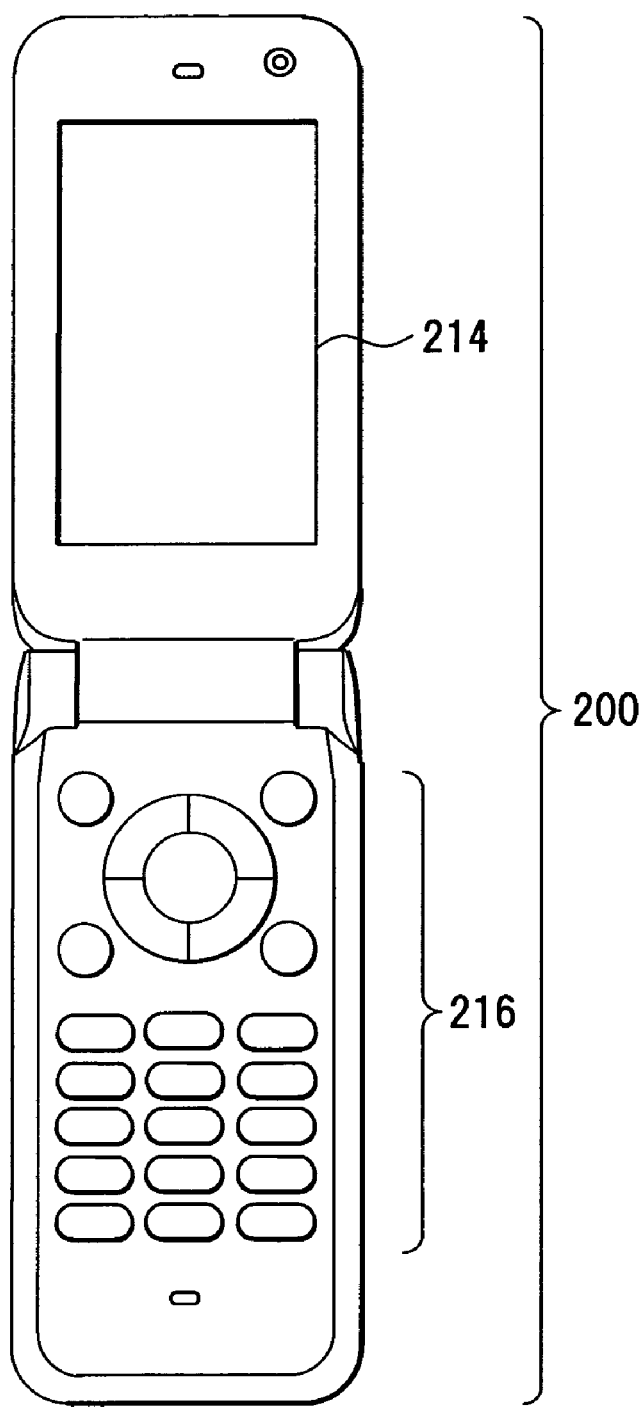
FIG. 18 shows an appearance of the portable terminal apparatus.

A third embodiment of the present invention will be described with reference to FIGS. 17 and 18. FIG. 17 shows a configuration example of a portable terminal apparatus and FIG. 18 shows an appearance of the portable terminal apparatus.

This portable terminal apparatus 200 is an example of a timer apparatus and includes a radio unit 204, a radio controlling unit 206, an application processing unit 208, memory units 210, 212, a displaying unit 214, an operation input unit 216, etc.

The radio unit 204 is controlled by the radio controlling unit 206, includes an antenna 218 to perform radio communication with a base station with the use of radio signals, and includes a transmission circuit and a reception circuit.

The radio controlling unit 206 is constituted by a computer and includes a CPU 220, a timer unit 222, a base band circuit 244, etc. The CPU 220 executes programs in the memory unit 210 to control the timer unit 222 and the base band circuit 224. The timer unit 222 generates time periods serving as a foundation for the time control of various task processes. The base band circuit 224 performs processes such as demodulation of audio signals or packet data from received radio signals and modulation of carrier signals with audio signals or packet data that are to be transmitted.

The memory unit 210 is connected to the radio controlling unit 206 and is constituted by a SDRAM (Synchronous Dynamic Random-Access Memory) 226 that is an example of a memory capable of reading and writing data, a FLASH memory 228 that is an example of a nonvolatile memory capable of reading and writing data as well as preventing data erasure, etc. The SDRAM 226 is used as a work area.

The application processing unit 208 includes a CPU 230 and various peripheral circuit units 232 to execute processes of various application programs. The CPU 230 executes application programs in the memory unit 212 to process input information from the operation input unit 216 and to control the displaying unit 214.

The memory unit 212 is connected to the application processing unit 208 and, as is the case with the aforementioned memory unit 210, is constituted by a SDRAM 234 that is an example of a memory capable of reading and writing data, a FLASH memory 226 that is an example of a nonvolatile memory capable of reading and writing data as well as preventing data erasure, etc. and the SDRAM 234 is used as a work area as well.

The displaying unit 214 is constituted by, for example, a LCD (Liquid Crystal Display) and is means for presenting process results and information in the middle of processing. The operation input unit 216 is constituted by a keyboard, etc. and used for inputting characters, etc.

The portable terminal apparatus 200 can be configured as shown in FIG. 18. According to such a configuration, the timer unit 4 shown in FIG. 1 can be applied to the timer unit 222, and the functions and processes described in the first embodiment can also be achieved in the portable terminal apparatus 200.

Other Embodiments (1) Although the down counter 24 is used for an example of a counter in the above embodiments, the counter may be achieved by the count-up operation and the present invention is not limited to the configurations of the embodiments.

(2) To reduce the operating clock of the CPU 6, a plurality of timer values may be arranged correspondingly to the timer value of the timer unit 4.

Figure 19:
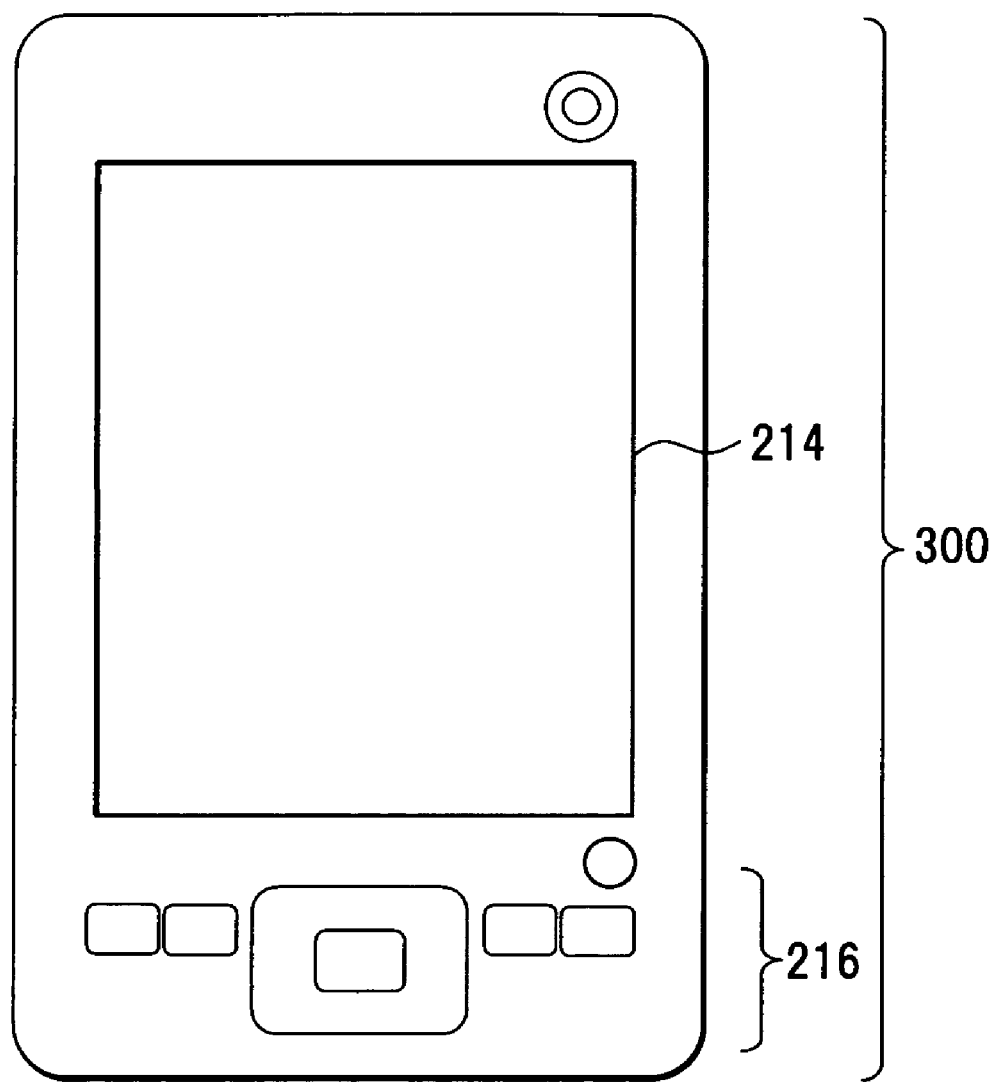
FIG. 19 shows an appearance of a portable information terminal according to another embodiment.
Figure 20:
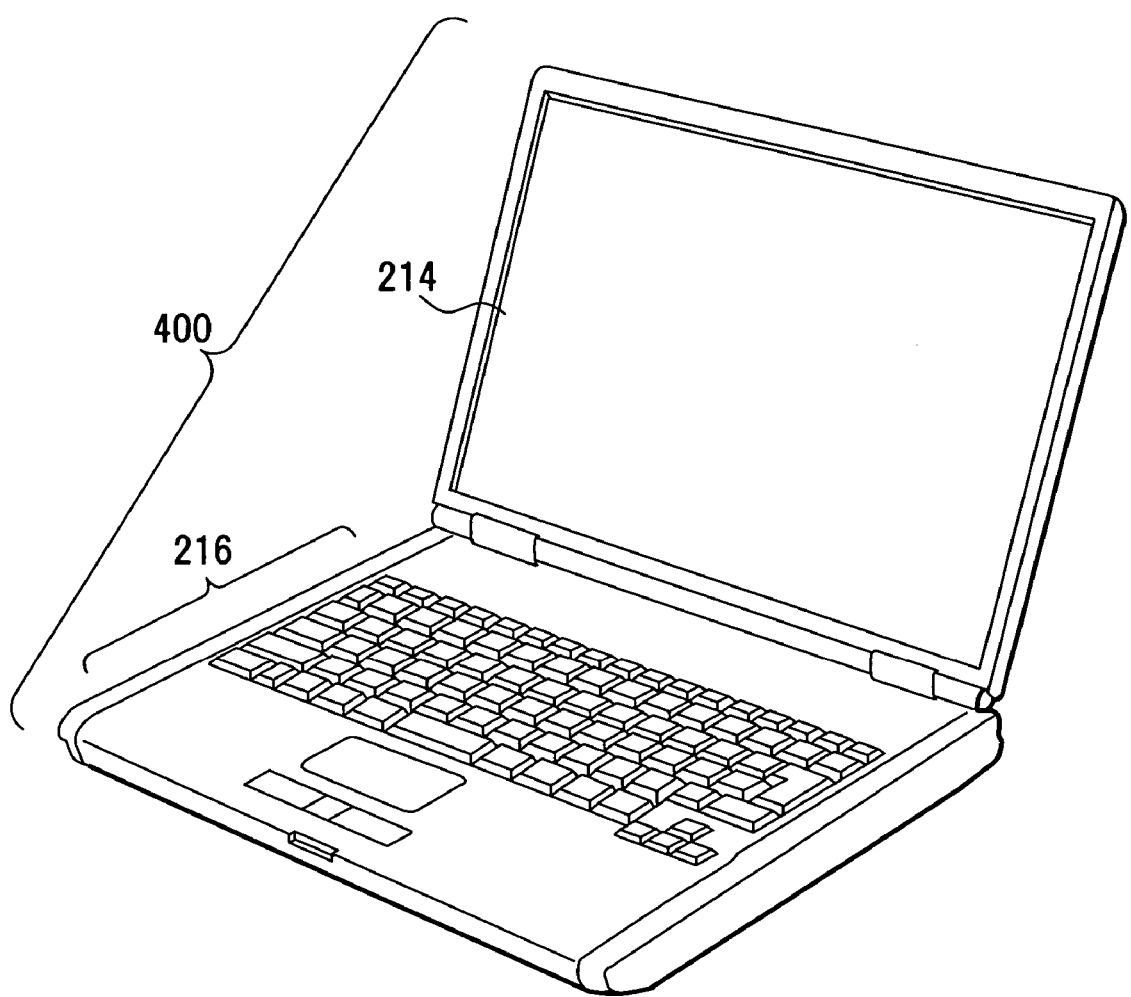
FIG. 20 shows an appearance of a personal computer according to another embodiment.

(3) Although the portable terminal apparatus 200 is illustrated for an application example of the timer apparatus in the above embodiments, the present invention can be applied to various electronic apparatuses that need timer functions, such as a personal digital assistant (PDA) 300, for example, as shown in FIG. 19, and a personal computer 400, for example, as shown in FIG. 20, and is not limited to the apparatuses of the embodiments. In FIGS. 19 and 20, the same numerals are added to the same portions as FIG. 17.

Although the presently preferred embodiments of the present invention have been set forth hereinabove, it is to be appreciated that the present invention is not limited to the above description, that various modifications and alterations can naturally be achieved by those who skilled in the art based on the gist of the present invention as defined in the claims or disclosed in the specification, and that such modifications and alterations are obviously included within the scope of the present invention.

The present invention relates to the timer generation corresponding to the timer requests from a plurality of task processes such as application programs executed by a computer and is useful since the present invention can achieve the efficient timer generation and the start and switching of the timer operation.

What is claimed is:

1. A timer apparatus that generates a timer output corresponding to a timer request, comprising:
   a first count setting unit that sets a first count value relating to the timer request;
   a second count setting unit that sets a second count value relating to the timer request;
   a counter that counts the first count value or the second count value, in case where the count value attains the first count value or the second count value, the counter generating a timer output that represents the attainment; and
   a calculating unit that calculates a difference value between the value counted by the counter and the second count value in the second count setting unit,
   the first count value or the second count value being updated to the difference value to allow the counter to count, correspondingly to a magnitude relation between the difference value and the second count value.

2. The timer apparatus of claim 1, comprising:
   a storing unit that receives a plurality of timer values relating to a plurality of timer requests to store the timer value for each timer request, the storing unit storing a difference between a certain timer value and another timer value for each of the timer values; and
   a timer setup processing unit that sets the first count value or the second count value to the timer value or the difference value read from the storing unit.

3. The timer apparatus of claim 1, comprising:
   notifying means, in case where the first count value or the second count value is updated to the difference value, notifying a timer request source of the update.

4. The timer apparatus of claim 1, comprising:
   a storing unit that receives a plurality of timer values relating to a plurality of timer requests to store the timer value for each timer request, the storing unit storing a difference between a certain timer value and another timer value for each of the timer values; and a timer request acceptance processing unit that calculates a difference between a certain timer value and another timer value for each of the timer requests to store the difference value into the storing unit for each of the timer values.

5. A timer processing method that generates a timer output corresponding to a timer request, comprising the processes of:

setting a first count value relating to the timer request;

setting a second count value relating to the timer request;

counting the first count value or the second count value and, in case where the count value attains the first count value or the second count value, generating a timer output that represents the attainment;

calculating a difference value between the counted value and the second count value; and updating the first count value or the second count value to the difference value correspondingly to a magnitude relation between the difference value and the second count value.

6. The timer processing method of claim 5, comprising the processes of:

receiving a plurality of timer values relating to a plurality of timer requests to store the timer value for each timer request and storing into a storing unit a difference between a certain timer value and another timer value for each of the timer values; and setting the first count value or the second count value to the timer value or the difference value read from the storing unit.

7. The timer processing method of claim 5, comprising the process of:

in case where the first count value or the second count value is updated to the difference value, notifying a timer request source of the update.

8. The timer processing method of claim 5, comprising the process of:

receiving a plurality of timer values relating to a plurality of timer requests, calculating a difference between a certain timer value and another timer value for each timer value, and storing the difference value into the storing unit for each of the timer values.

9. An electronic apparatus that generates a timer output corresponding to a timer request, comprising:

a first count setting unit that sets a first count value relating to the timer request;

a second count setting unit that sets a second count value relating to the timer request;

a counter that counts the first count value or the second count value, in case where the count value attains the first count value or the second count value, the counter generating a timer output that represents the attainment; and a calculating unit that calculates a difference value between the value counted by the counter and the second count value in the second count setting unit, the first count value or the second count value being updated to the difference value to allow the counter to count, correspondingly to a magnitude relation between the difference value and the second count value.

10. The electronic apparatus of claim 9, comprising:

a storing unit that receives a plurality of timer values relating to a plurality of timer requests to store the timer value for each timer request, the storing unit storing a difference between a certain timer value and another timer value for each of the timer values; and a timer setup processing unit that sets the first count value or the second count value to the timer value or the difference value read from the storing unit.

11. The electronic apparatus of claim 9, comprising:

notifying means, in case where the first count value or the second count value is updated to the difference value, notifying a timer request source of the update.

12. The electronic apparatus of claim 9, comprising:

a storing unit that receives a plurality of timer values relating to a plurality of timer requests to store the timer value for each timer request, the storing unit storing a difference between a certain timer value and another timer value for each of the timer values; and a timer request acceptance processing unit that calculates a difference between a certain timer value and another timer value for each of the timer requests to store the difference value into the storing unit for each of the timer values.

* * * * *